US012044414B2

(12) United States Patent
Trice

(10) Patent No.: US 12,044,414 B2
(45) Date of Patent: Jul. 23, 2024

(54) MICROWAVE COOKING APPLIANCE WITH ARTICULATING COOKING CAVITY

(71) Applicant: Midea Group Co., Ltd., Foshan (CN)

(72) Inventor: Daniel J. Trice, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 632 days.

(21) Appl. No.: 17/218,376

(22) Filed: Mar. 31, 2021

(65) Prior Publication Data

US 2022/0316714 A1 Oct. 6, 2022

(51) Int. Cl.
*H05B 6/64* (2006.01)
*F24C 7/02* (2006.01)
*F24C 15/16* (2006.01)
*H05B 6/78* (2006.01)

(52) U.S. Cl.
CPC ................ *F24C 15/16* (2013.01); *F24C 7/02* (2013.01); *H05B 6/6408* (2013.01)

(58) Field of Classification Search
CPC .......... F24C 15/16; F24C 7/02; H05B 6/6402; H05B 6/6408; H05B 6/6426
USPC ............... 219/762, 739, 403, 404, 753, 763; 126/334, 332, 339, 340, 337 R, 273 A, 126/190, 192, 37 B, 19 M
See application file for complete search history.

(56) References Cited

U.S. PATENT DOCUMENTS 3,343,904 A 9/1967 Laug
4,424,431 A 1/1984 Gurubatham
5,338,922 A 8/1994 Kim et al.
5,938,968 A 8/1999 Ogg et al.
6,073,624 A 6/2000 Laurent
7,069,924 B2 7/2006 Kuttalek
7,770,986 B1 * 8/2010 Simaitis ............... A47B 46/005 312/246
9,513,016 B2 12/2016 Martin
10,278,240 B2 4/2019 Ham
2009/0321430 A1 12/2009 Jeong
2011/0084065 A1 4/2011 Gibson et al.
2011/0084067 A1 4/2011 Gibson et al.
2016/0374157 A1 12/2016 Ham
(Continued)

FOREIGN PATENT DOCUMENTS

CN 1632381 A 6/2005
CN 101135465 A 3/2008
(Continued)

OTHER PUBLICATIONS

Maytag, MMV5208WW Microwave Ovens—Over-the-Range, ABC Appliances, Retrieved from https://www.abcapplianceandtv.com/en/product/89814-maytag-mmv5208ww#89814_product_1, Retrieved on Nov. 4, 2020.
(Continued)

*Primary Examiner* — Quang T Van
(74) *Attorney, Agent, or Firm* — Gray Ice Higdon

(57) ABSTRACT

A microwave cooking appliance allowing better access into the cooking cavity. The microwave cooking appliance may include a portion of the cooking cavity articulating to a deployed position from the housing. The appliance may include one or more linkage members connected to the articulating cavity portion. The appliance may include a linkage track member guiding the one or more linkage members and/or articulating cavity portion between positions.

20 Claims, 6 Drawing Sheets

(56) References Cited

U.S. PATENT DOCUMENTS

| | | | |
|---|---|---|---|
| 2019/0239295 | A1 | 8/2019 | Jang et al. |
| 2019/0350407 | A1 | 11/2019 | Sharpe |

FOREIGN PATENT DOCUMENTS

| | | | |
|---|---|---|---|
| CN | 202868783 | U | 4/2013 |
| CN | 107490032 | A | 12/2017 |
| CN | 110953616 | A | 4/2020 |
| GB | 2271045 | A | 3/1994 |
| KR | 960005773 | B1 | 5/1996 |
| KR | 20010047058 | A | 6/2001 |

OTHER PUBLICATIONS

The Level Hot Pantry, The Level Oven, Retrieved from: https://level.ai/, Retrieved on Mar. 18, 2021.

LG, Over the Range Microwave with EasyUp Door, LG Electronics, Retrieved from: https://www.lg.com/us/cooking-appliances/lg-LMVM2277-over-the-range-microwave, Retrieved on Mar. 18, 2021.

Related Applications Transmittal dated Oct. 24, 2023.

Van, Quang T., United States Patent and Trademark Office, Non-Final Office Action issued in U.S. Appl. No. 17/205,776, dated Oct. 17, 2023.

Van, Quang T., United States Patent and Trademark Office, Notice of Allowance issued in U.S. Appl. No. 17/205,776, 24 pages, dated Mar. 6, 2024.

Canadian Patent Office, Examiner Requisition issued in Application No. 3,152,687, 3 pages, dated Feb. 5, 2024.

Canadian Patent Office, Examiner Requisition issued in Application No. 3,152,687, 4 pages, dated Mar. 21, 2023.

* cited by examiner

MICROWAVE COOKING APPLIANCE WITH ARTICULATING COOKING CAVITY

BACKGROUND

The present embodiments relate to a microwave cooking appliance integrated with an articulating cavity.

Typical microwave cooking appliances may have a fixed cooking cavity to access the contents of the cooking cavity. This potentially restricts the user's ability to access the contents. Thus, there is a need for articulating the cooking appliance cavity, or portion thereof (e.g. bottom or tray), to allow better access to the contents of the cooking cavity.

SUMMARY

In some embodiments of the invention, for example, a microwave cooking appliance may include a cooking cavity having an articulating cavity portion. In some embodiments, the cooking cavity may include a door cavity portion. In various embodiments, the cooking cavity may include a housing cavity portion. In some embodiments, the appliance may include a housing having an opening and a bottom. In various embodiments, the housing may include the housing cavity portion. In some embodiments, the appliance may include a door including the door cavity portion, wherein the door may be movable between a closed position closing the opening and an open position different from the closed position. In addition, in some embodiments, the articulating cavity portion may be movable between a stowed position to define the cooking cavity with the door cavity portion and the housing cavity portion and a deployed position different from the stowed position. In various embodiments, the articulating cavity portion may move from the stowed position outwardly and downwardly to the deployed position in front of and/or lower than the bottom of the housing.

In some embodiments, the appliance may include a first plurality of linkage members and/or a second plurality of linkage members coupling the articulating cavity portion to the housing. In various embodiments, the first plurality of linkage members may be a ten bar mechanism and/or the second plurality of linkage members may be a four bar mechanism. In some embodiments, the four bar mechanism may include at least one linkage track member guiding the articulation of the articulating cavity portion between the stowed position and the deployed position. In various embodiments, at least one linkage track member may include a pin and slot engagement with the first plurality of linkage members. In various embodiments, the pin and slot engagement may include a straight slot and an arcuate slot. In some embodiments, the appliance may include a plurality of linkage members having a linkage track member guiding the articulation of the articulating cavity portion between the stowed position and the deployed position. In various embodiments, the linkage track member may include a pin and slot engagement with another one of the plurality of linkage members. In some embodiments, the pin and slot engagement may include a slot having a straight portion and an arcuate portion. Moreover, in various embodiments, the articulating cavity portion may travel separately in a longitudinal direction and an arcuate direction between the stowed position and the deployed position.

In various embodiments, a microwave cooking appliance may include a cooking cavity having an articulating cavity portion. In some embodiments, the cooking cavity may include a door cavity portion. In various embodiments, the cooking cavity may include a housing cavity portion. In some embodiments, the appliance may include a housing having an opening and a bottom. In various embodiments, the housing may include the housing cavity portion. In some embodiments, the appliance may include a door that includes the door cavity portion. In various embodiments, the door may be movable between a closed position closing the opening and an open position different from the closed position. In some embodiments, the articulating cavity portion may be movable between a stowed position to define the cooking cavity with the door cavity portion and the housing cavity portion and a deployed position different from the stowed position. In various embodiments, the articulating cavity portion may move from the stowed position outwardly and downwardly to the deployed position in front of and/or lower than the bottom of the housing. In addition, in various embodiments, the appliance may include a plurality of linkage members coupling the housing to the articulating cavity portion. In some embodiments, the plurality of linkage members may include a linkage track member guiding the articulation of the articulating cavity portion between the stowed position and the deployed position.

In addition, in some embodiments, the articulating cavity portion may travel separately in a longitudinal direction and an arcuate direction between the stowed position and the deployed position. In various embodiments, the linkage track member may include a pin and slot engagement with another one of the plurality of linkage members. In some embodiments, the slot may include a straight portion and an arcuate portion. Moreover, in various embodiments, the door may include a choke groove, wherein the choke groove seals against the articulating cavity portion and the housing when both the door is in the closed position and the articulating cavity portion is in the stowed position. In various embodiments, the articulating cavity portion may include at least one flange adjacent the opening of the housing when in the stowed position. In some embodiments, at least one flange may depend downwardly from a bottom wall of the articulating cavity portion. In various embodiments, a bottom wall of the articulating cavity portion may be at an elevation lower than an elevation of the bottom of the housing in the deployed position than in the stowed position.

In some embodiments, a microwave cooking appliance may include a cooking cavity having an articulating cavity portion. In various embodiments, the articulating cavity portion may include a bottom wall. In some embodiments, the appliance may include a housing having an opening and a bottom. In various embodiments, the appliance may include a door movable between a closed position closing the opening and an open position different from the closed position. In addition, in various embodiments, the appliance may include a plurality of linkage members coupling the housing to the articulating cavity portion. In some embodiments, the articulating cavity portion may be movable between a stowed position within the housing and a deployed position different from the stowed position. In various embodiments, the bottom wall of the articulating cavity portion may be at a first elevation when in the stowed position and a second elevation when in the deployed position lower than an elevation of the bottom of the housing and/or the first elevation.

In addition, in some embodiments, the plurality of linkage members may include at least one pin and slot engagement between at least two linkage members. In various embodiments, a slot of at least one pin and slot engagement may include a straight portion and an arcuate portion. In some embodiments, the articulating cavity portion may include a back wall and opposing side walls extending upwardly from the bottom wall. Moreover, in some embodiments, the articulating cavity portion may include at least one flange depending from the bottom wall. In some embodiments, the bottom wall of the articulating cavity portion may not vertically overlap with the bottom of the housing when in the deployed position. In various embodiments, the bottom wall of the articulating cavity portion may be at least partially in front of the bottom of the housing when in the deployed position.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
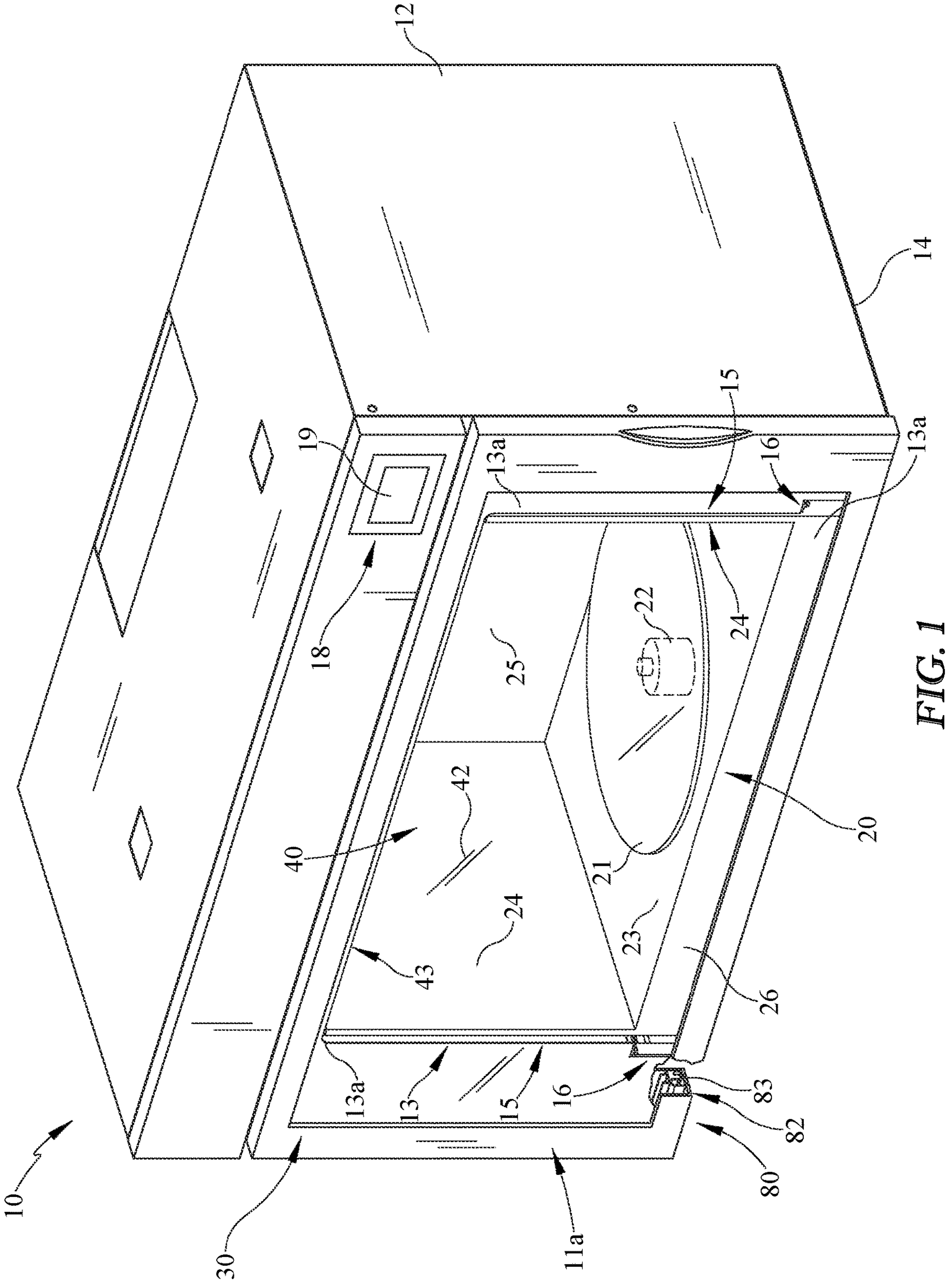
FIG. 1 is a perspective view of an embodiment of a microwave cooking appliance illustrating a door in the closed position, and one embodiment of an articulating cavity portion and the linkage members in a stowed position.

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques and apparatuses within a microwave cooking appliance, such as the type that may be used in single-family or multi-family dwellings, or in other similar applications. However, it will be appreciated that the herein-described techniques may also be used in connection with other types of microwave cooking appliances in some embodiments. For example, the herein-described techniques may be used in commercial or recreational vehicle applications in some embodiments.

Turning now to the drawings, wherein like numbers denote like parts throughout the several views, FIGS. 1-6 illustrate an example microwave cooking appliance 10 in which the various technologies and techniques described herein may be implemented. Microwave cooking appliance 10 is a residential-type microwave cooking appliance, and as such includes a housing or enclosure 12, which further includes a cooking cavity 40, or portion thereof. The appliance 10 may include a door 30 disposed adjacent the respective opening 13 of the cooking cavity 40 or housing 12. The door 30 may form a portion (e.g. door cavity portion 42) of the cooking cavity 40. The cooking cavity 40 may be defined by or include a tray, member, or articulating cavity portion 20 positionable between a stowed position and a deployed position relative to the remaining portion of the cooking cavity 40 (e.g. door cavity portion 42, housing cavity portion 43, etc.) or housing 12 (e.g. bottom 14). In various embodiments, the articulating cavity portion 20 may include a rotating turntable 21 and/or motor 22 driving the turntable 21. The articulating cavity portion 20 may be define at least a portion of the opening 13 (e.g. periphery) of the cooking cavity 40 or housing 12. In some embodiments, the door 30 (e.g. frame, choke groove 83) may seal against a portion of the articulating cavity portion 20 (e.g. flange(s) 26, bottom 23, etc.). The articulating cavity portion 20 may be disposed adjacent to the opening 13 and/or a bottom 14 (e.g. fixed bottom) of the housing 12 within the housing 12 when in the stowed position. In some embodiments, the articulating bottom portion 20, or portions thereof, may articulate away (e.g. downwardly and/or outwardly) from the housing 12 and/or remaining portions of the cooking cavity 40/housing 12/bottom 14, which are described in greater detailed herein. In some embodiments, the articulating cavity portion 20 and/or door 30 may be linked/moved together, or separately as shown, when positioned between their closed/stowed positions and open/deployed positions.

In some implementations, the articulating cavity portion may include a body defining one or more walls, surfaces, or portions of the cooking cavity 40, cavity opening 13 (e.g. periphery), cavity 15, and/or housing 12. In the one embodiment shown, the articulating bottom portion 20 may include at least a bottom wall 23. Moreover, in some embodiments, the articulating bottom portion 20 may include one or more opposing side walls 24 and/or back wall 25 extending or projecting upwardly from the bottom wall 23. The bottom wall 23 may include the motor 22, if used, rotatably driving the turntable 21, if used. Alternatively, in some embodiments, the motor, if used, may be positioned with the housing rather than the articulating cavity portion. The articulating bottom portion 20 may include one or more flanges 26. The flanges 26 may define one or more portions of the opening 13 or cooking cavity 40. As shown in the one embodiment, at least one flange 26 may be adjacent the front edge of the portion 20 or bottom wall 23. The flange 26 may depend from the bottom wall 23. The flange 26 may define a portion of the periphery defining the opening 13 and/or be sealed by or against the door 30 (e.g. choke groove). The flange 26 may define a lower pathway or opening 16 that the articulating cavity portion and/or linkage members may pass through during movement or travel. The pathway 16 may be closed by the flange 26 when the articulating cavity portion 20 is in the stowed position. It should be understood that the articulating cavity portion may be a variety of shapes, sizes, quantities, and constructions and still be within the scope of the invention. For example, in some embodiments, one or more flanges may extend from the front edges of the side walls 24 laterally outward to close/open the cavity 15 that the one or more linkages deploy from when the articulating cavity portion deploys and/or may be sealed by the door.

The microwave cooking appliance 10 may also include one or more user activated controls 18, which may be in the form of buttons, knobs, a touchscreen, or the like. In some embodiments, these user activated controls 18 may be used to program a cooking time and/or a cooking power level. In various embodiments, the controls 18 may open and/or close the door 30 and/or articulating cavity portion 20 between one or more positions (e.g. open position, closed position, stowed position, deployed position, etc.). In some implementations, the articulating cavity portion 20 and/or door 30 may include one or more handles allowing the user to open and/or close the door and/or stow and/or deploy or activate the opening/closing of the articulating cavity portion 20. In addition, in some embodiments, these user activated controls 18 may be used to select one or more preset conditions for a particular food item to be cooked or a particular desired action (e.g. "popcorn", "defrost", "frozen pizza", etc. The microwave cooking appliance 10 may also include a user interface display 19, which may be used to convey a variety of information to a user. For example, in some embodiments, the display 19 may be used to display the time when the microwave cooking appliance 10 is not in use. In other embodiments, the display 19 may be used to display cooking times, power levels, one or more positions of the door 30 or articulating cavity portion 20, and/or temperatures.

Figure 3:
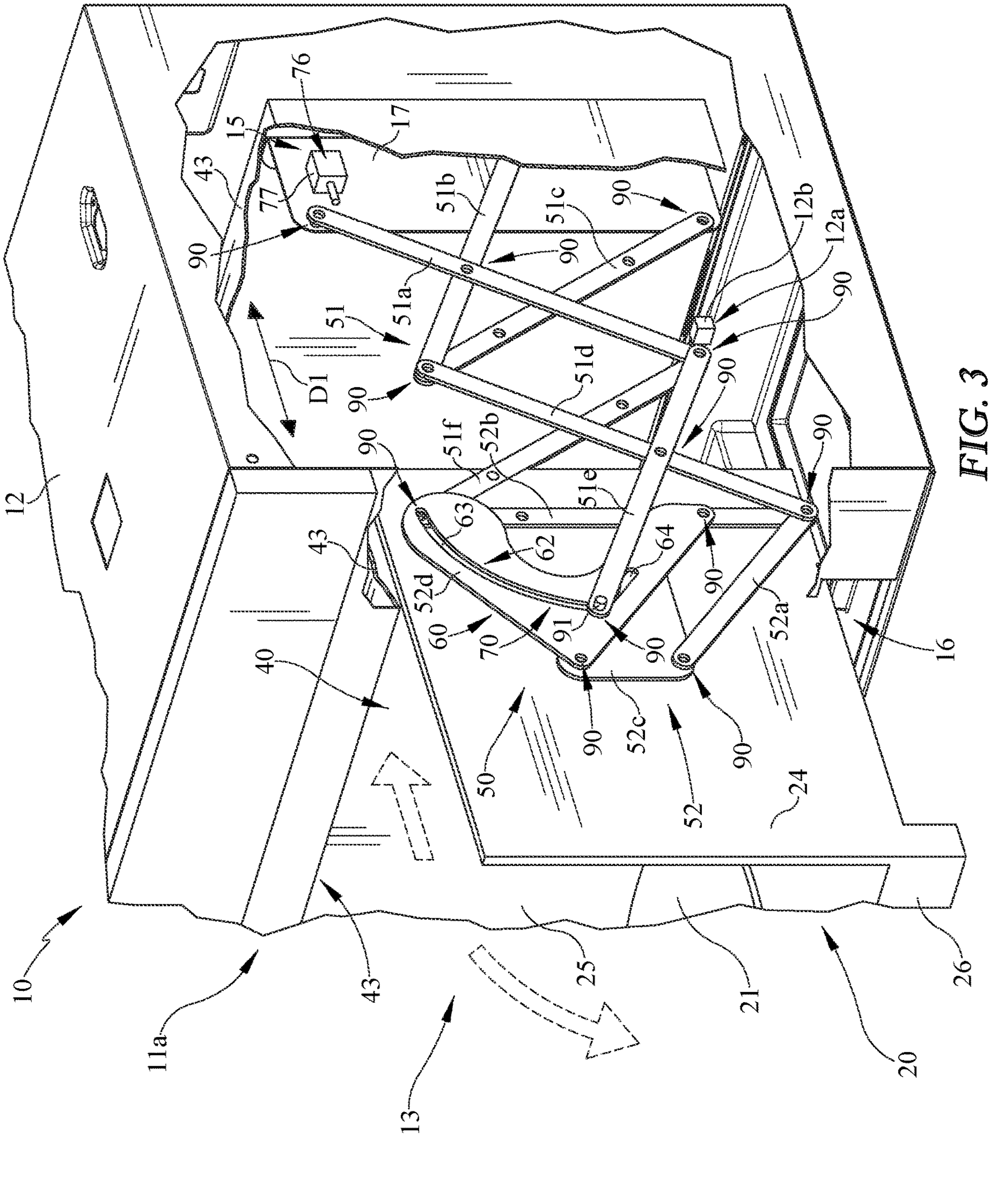
FIG. 3 is a perspective view of the microwave cooking appliance of FIG. 2 illustrating the linkage members and the articulating cavity portion in a deployed position after linear and/or outward movement of the articulating cavity portion, and illustrating the pin and slot engagement before arcuate and/or pivoting movement of the articulating cavity portion.
Figure 4:
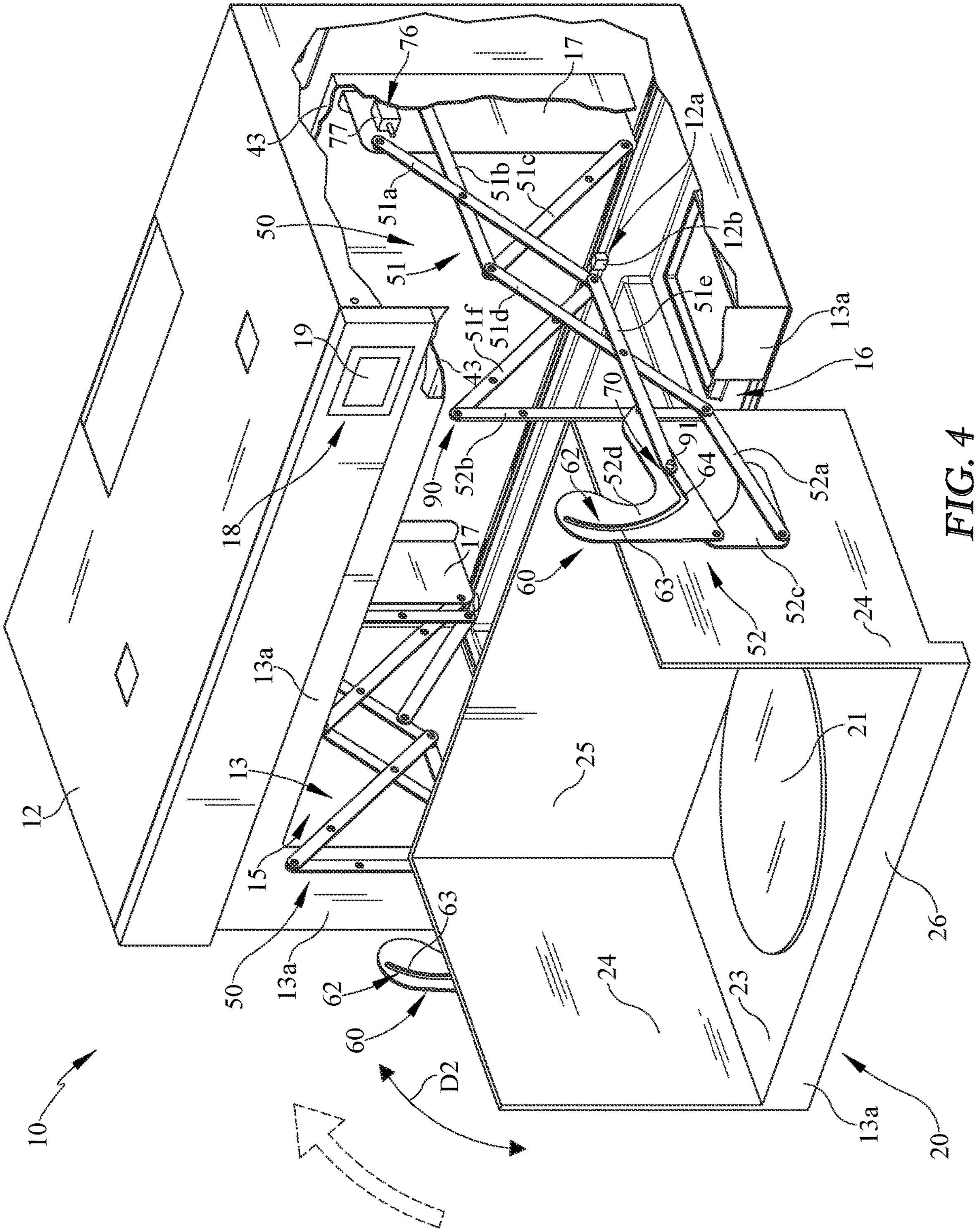
FIG. 4 is a perspective view of the microwave cooking appliance of FIG. 3 illustrating the linkage members and the articulating cavity portion in a deployed position after arcuate and/or pivoting movement of the articulating cavity portion downwardly, forward of the cooking appliance or opening and/or below an elevation of the appliance bottom towards the user, and illustrating the pin and slot engagement after arcuate and/or pivoting movement of the articulating cavity portion.
Figure 5:
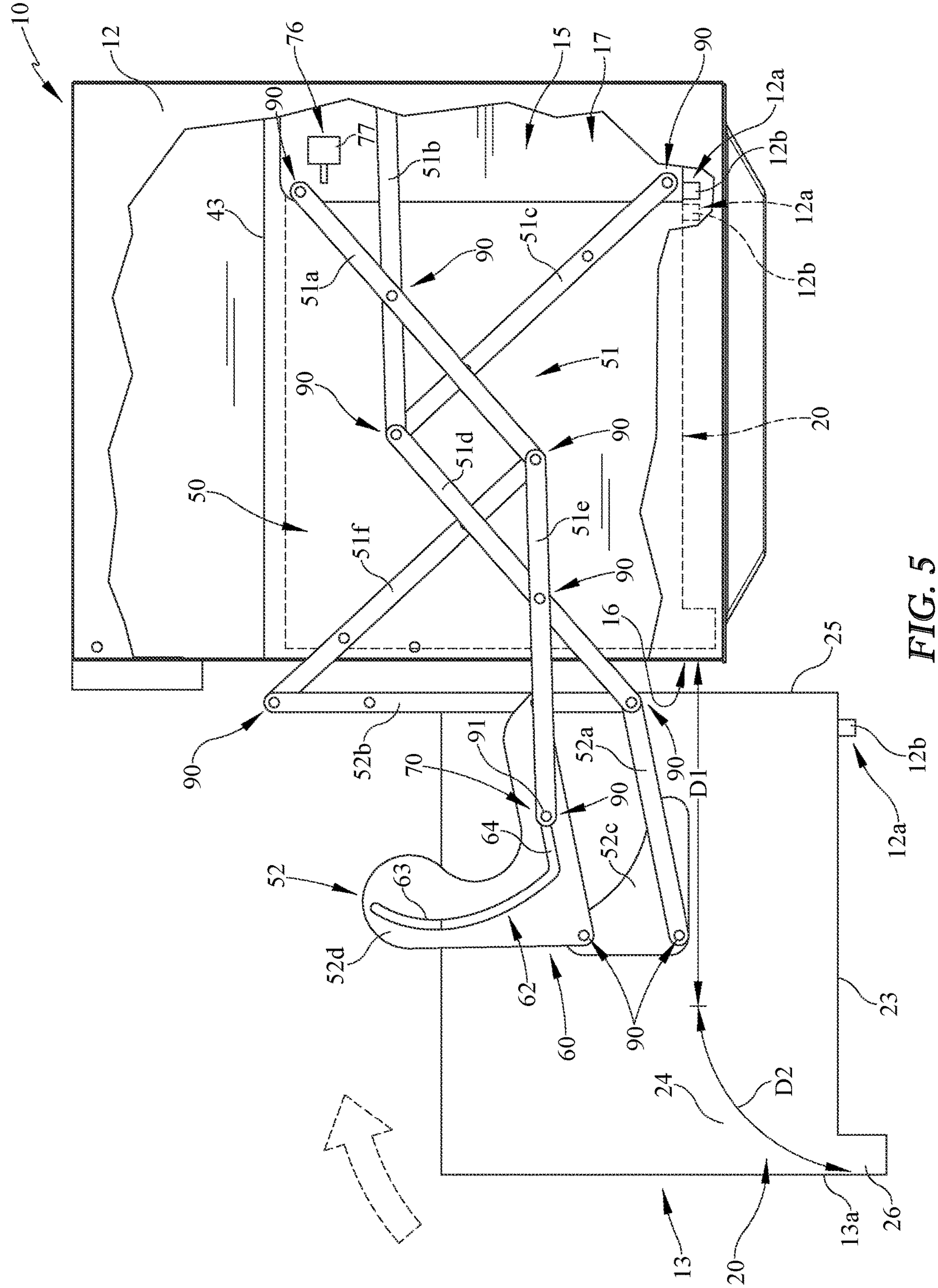
FIG. 5 is an side view of the microwave cooking appliance of FIG. 4, and illustrating the articulating cavity portion in broken lines when in the stowed position.
Figure 6:
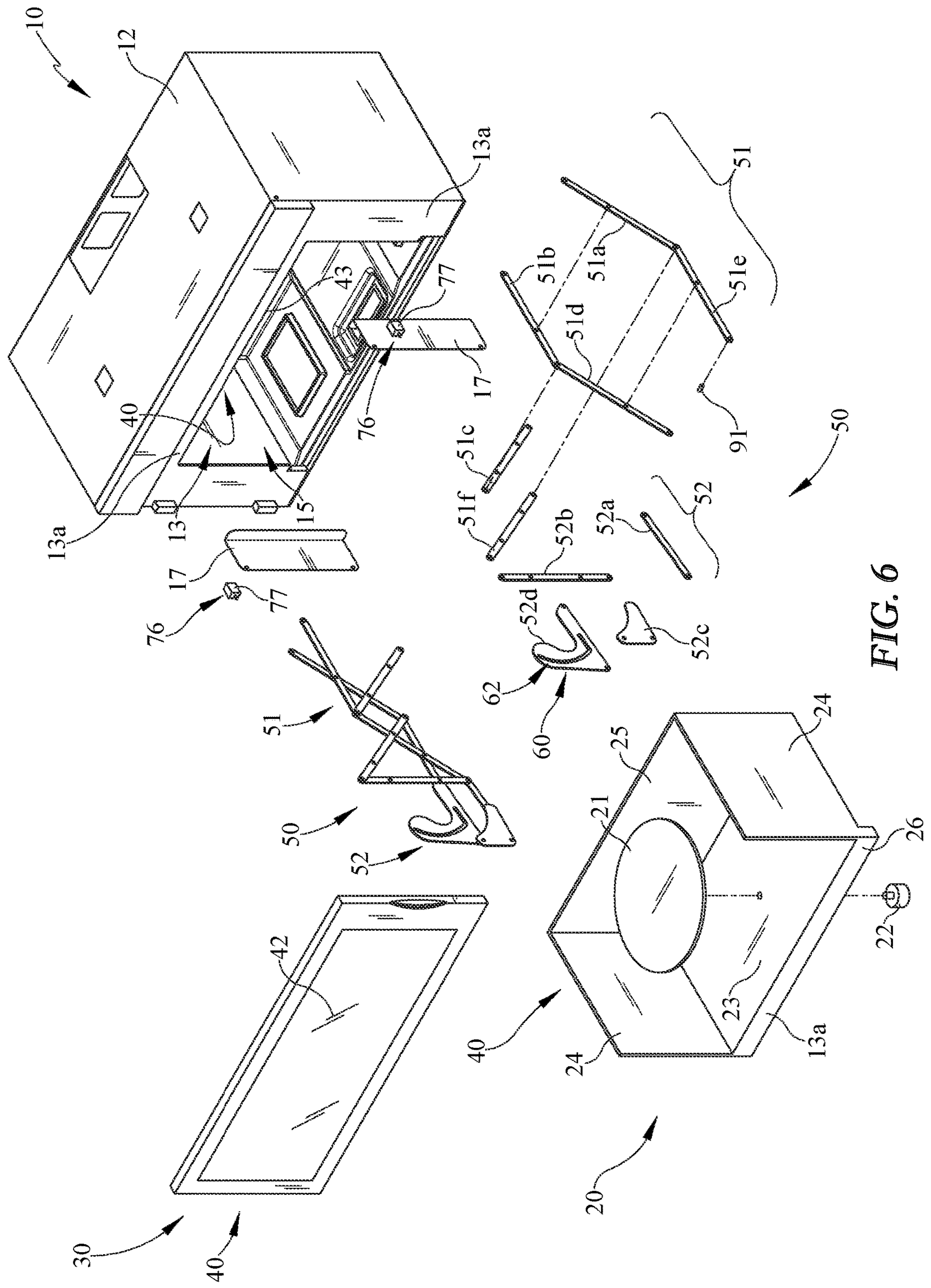
FIG. 6 is an exploded view of the microwave cooking appliance of FIG. 1.

In some implementations, the appliance 10 may include one or more articulating cavity portions 20. The articulating cavity portion 20 may be positionable or movable between a stowed position (FIGS. 1 and 2) and a deployed position (FIGS. 2-5). In the stowed position, the articulating cavity portion 20 may be at least partially positioned in the housing 12, may define a portion of the cooking cavity 40, and/or operably engage or close the opening 16 and/or cavity 15. In the one embodiment shown, the articulating cavity portion 20 defines the cooking cavity 40 with the door cavity portion 42 and/or the housing cavity portion 43 (e.g. top wall). In the deployed position, the articulating cavity portion 20 is in a position different from the closed position and/or at least partially outside or away from the remaining portion of the housing 12 and/or cooking cavity 40. The articulating cavity portion 20 may be articulated laterally/outwardly (e.g. towards the user or in a direction towards the front side 11*a* of the appliance and/or outwardly in front of the opening 13) and downwardly away (e.g. from the bottom 14) from its stowed position (e.g. see the stowed portion 20 in broken lines as shown in FIG. 5) to the deployed position (e.g. see the deployed portion 20 in solid lines as shown in FIG. 5). This positions the articulating cavity portion 20, or portions thereof, at a lower height or elevation and closer to the user than when in the stowed position when operating the cooking cavity 40. The bottom wall 23 or other portions of the articulating cavity portion 20 may be at lower elevation than the elevation of the bottom 14 of the housing 12 when in the deployed position than when in the stowed position. The bottom wall 23 of the articulating cavity portion 20 may be at a first elevation when in the stowed position and at a second elevation when in the deployed position. The second elevation may be lower than the elevation of the bottom 14 of the housing 12 and/or the first elevation. The user may be able to load and/or unload the contents positioned on the articulating cavity portion 20 (e.g. turntable 21, if used) when at the lower and more proximal position to the user when in the deployed positon. In some embodiments, the user may access the contents when in the stowed position. When in the deployed position, the articulating cavity portion 20, or portions thereof (e.g. bottom wall 23), may be articulated forward/outwardly (e.g. laterally offset from the stowed position or fully outside the housing 12) and downwardly at least partially in front of the opening 13, bottom 14, and/or housing 12. In one embodiment as shown in FIG. 5, the bottom wall 23 of the articulating cavity portion 20 may not vertically overlap with the bottom 14 of the housing 12. In some implementations, the bottom may travel vertically and/or longitudinally up/down and laterally forward/backward between the stowed and deployed positions. In the one embodiment shown, when the articulating cavity portion 20 travels from the stowed position to the open position, the articulating cavity portion 20 moves outwardly in a substantially horizontal and/or linear path/direction D1 and then subsequently pivots/moves downwardly and/or laterally along an arcuate path/direction D2 towards the user in a direction lateral/perpendicular to the horizontal path. The articulating cavity portion 20 (e.g. bottom wall, turntable, etc.) remains in a substantially horizontal orientation when traveling between the deployed and stowed positions. It should be understood the articulating cavity portion 20 may travel in a variety of directions and distances between the stowed and deployed position.

In some implementations, the appliance 10 may include one or more cavities or channels 15. The cavity 15 may be defined by one or more portions of the housing 12, articulating cavity portion 20, and/or cooking cavity 40. The cavity 15 within the housing 12 or appliance 10 may house the linkage members 50, limit switch 77, if used, and/or actuator, if used. The articulating cavity portion 20 or cooking cavity 40 may be in fluid communication with the one or more cavities 15 and/or fan when in the stowed position. In the closed position, the articulating cavity portion 20 (e.g. flange or member 26) may close or define the cavity 15, 16. The one or more linkage members 50, or portions thereof, are deployed from the cavity 15 in the deployed position.

In some embodiments, the microwave cooking appliance 10 may include a variety of connections 12*a* in communication with the articulating cavity portion 20 and/or the remainder of the housing 12 or portions of the appliance 10. As shown in the one embodiment in FIGS. 2-5, the turntable 21 and/or motor 22, if used, of the articulating cavity portion 20 may be powered and/or connected by one or more connections 12*a* (e.g. contact pins 12*b*) to one or more portions or components of the appliance 10 (e.g. controls 18, electrical, power). The articulating cavity portion 20 may include one or more contact pins 12*b* that correspond to one or more contact pins 12*b* with the remaining portion of the housing 12. When the articulating cavity portion 20 is in the stowed position (FIGS. 2 and 5—shown in broken lines), the one or more contact pins 12*b* of the articulating cavity portion 20 and remaining portion of the housing 12 engage each other to enable communication (e.g. electrical) between the appliance/bottom, or portions thereof. When the articulating cavity portion 20 is in the deployed position (FIGS. 3 and 5—solid lines), the one or more contact pins 12*b* are disengaged from each other and may place one or more components of the appliance/articulating cavity portion out of communication with each other. In some embodiments, one or more wires, if used, may connect the controls 18 and/or articulating cavity portion 20 alone or in combination with the contact pin engagement, if used.

Figure 2:
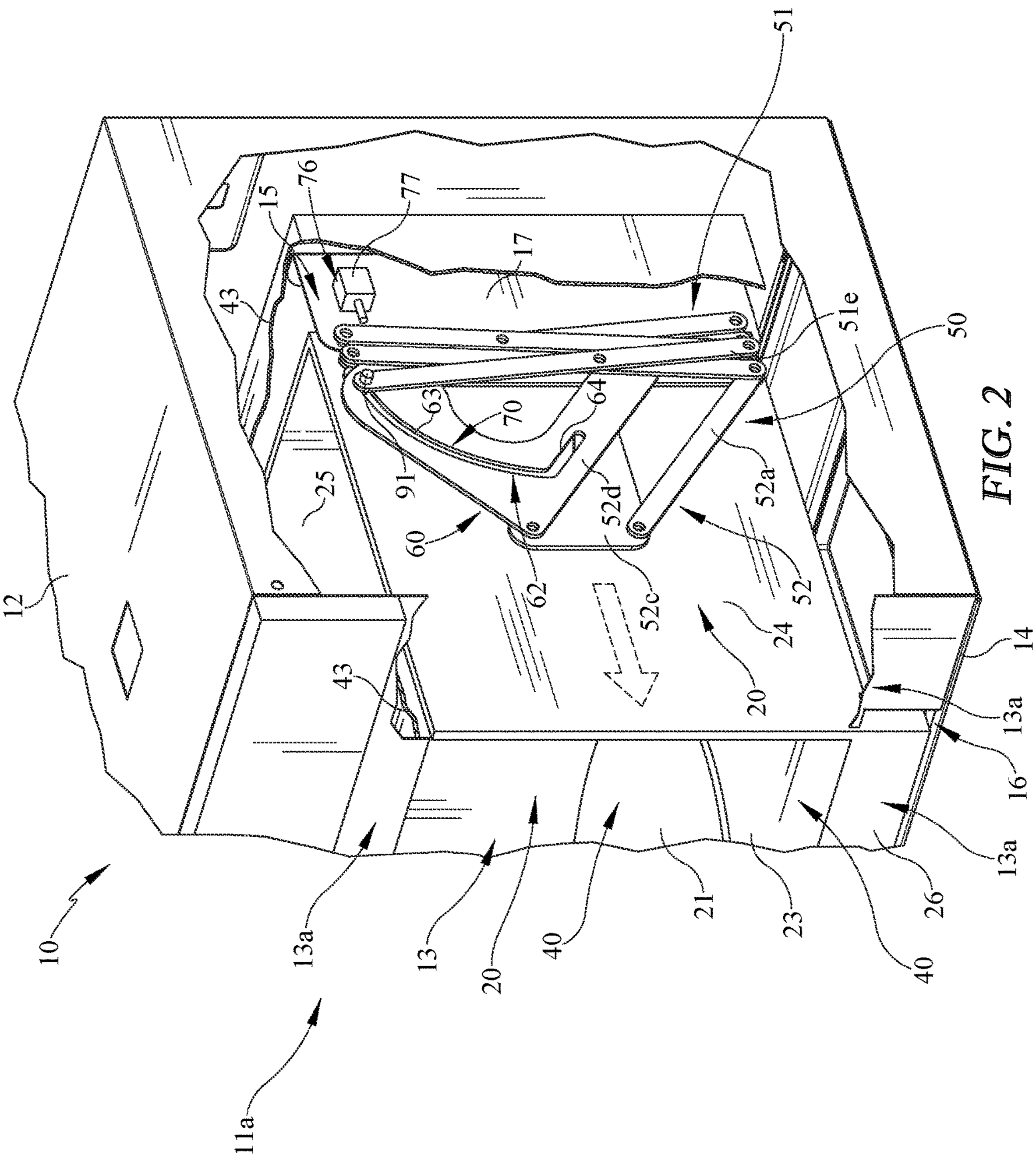
FIG. 2 is a perspective view of the microwave cooking appliance of FIG. 1 with portions of the housing broken away and the door in an open position and/or removed, illustrating the articulating cavity portion and the linkage members in the stowed position, and illustrating a pin and slot engagement before linear and/or outward travel of the articulating cavity portion

In some implementations, the appliance 10 and/or articulating cavity portion 20 may include one or more sealing systems 80 between the articulating cavity portion 20 and the remainder of the housing 12 and/or door 30 when both are in the closed/stowed position to capture or shield microwave leakage. In some embodiments, the cooking cavity 40 may be sealed by a seal 82 between the door 30 and the opening 13/articulating cavity portion 20. The opening 13 may be defined by an outer periphery 13*a*. The outer periphery 13*a* may include one or more portions of the articulating cavity portion 20. The door 30, or portions thereof, may seal against the outer periphery 13*a*. In the one embodiment shown, the outer periphery 13*a* may be three sides of the front side 11*a* of the housing 12 and a portion (e.g. flange 26) of the articulating cavity portion 20 (e.g. front side or edge of the portion 20). The flange 26, if used, of the outer periphery 13*a* defining the opening 13 may travel with the articulating cavity portion 20 between the stowed and deployed position. The door 30/seal 82 (e.g. choke groove 83) may cover or overlap the bottom front side/edge or flange 26 when in the stowed position as shown in FIGS. 1, 2, and 5. The frame or seal 82 may capture or shield microwave leakage when positioned between the door 30 and the remainder of the housing 12 and/or articulating cavity portion 20 when both the door and/or articulating cavity portion 20 are in the closed/stowed position. The seal 82 may include the choke groove 83 of the door 30. The choke groove 83 of the door, if used, may capture microwaves along the front flange/edge or periphery 13*a* of the articulating cavity portion 20/housing 12 when the door is in the closed position. The choke groove 83 may be positioned along the outer periphery of the door (e.g. frame).

In some implementations, the appliance 10 may include one or more linkage members 50 articulating between a stowed position and a deployed position. The plurality of linkage members 50 couple the housing 12 or portions thereof to the articulating cavity portion 20. The deployed positon being different from the stowed position. As shown in FIG. 2, the stowed position may position the one or more linkage members 50, or portions thereof, within the cavity 15 thereby positioning the articulating cavity portion 20 in the stowed position. As shown in FIGS. 3-5, the deployed position may position the one or more linkage members 50, or portions thereof, out of the cavity 15 thereby positioning the articulating cavity portion 20 in the deployed position. The actuator, if used, may articulate the plurality of linkage members 50 between the stowed and deployed positions. As shown in the one embodiment, the lateral side walls 24 of the articulating cavity portion 20 may each have a set of the plurality of linkage members 50 connecting the housing/actuator to the articulating cavity portion 20. It should be understood that one lateral side/cavity 15 may include the linkage members 50 or be in a variety of positions. The appliance may have similar or different components on each side of the housing/articulating cavity portion.

For ease of understanding, the articulating mechanism positioned on or attached to one side of the articulating cavity portion 20 will be described. In some implementations, the plurality of linkage members 50 may include a first plurality of linkage members 51 coupled to one or more second plurality of linkage members 52. The first plurality linkage members 51 may be coupled to the housing (e.g. bracket 17) and/or portions of the appliance and then in series to the second plurality of linkage members 52 to the articulating cavity portion 20 (e.g. side walls 24). The first plurality of linkage members 51 may be a ten bar mechanism as shown in the one embodiment. The second plurality of linkage members 52 may be a four bar mechanism as shown in the one embodiment. The first plurality of linkage members 51 may include linkage members 51*a-f*. The second plurality of linkage members 52 may include linkage members 52*a-d*. The pin or engagements 90 between linkage members, or portions thereof, may be a variety of sizes, shapes, quantities, materials, positions within the linkage(s), and construction and still be within the scope of the invention. The pins may allow for sliding, pivoting, and/or rotating engagements between members and/or portions of the appliance. For example, the pin may include a bearing or bearing surfaces.

In some implementations, the plurality of linkage members 50 (e.g. first 51, second 52, etc.) may articulate between the stowed position wherein the articulating cavity portion 20 is in the stowed positon and the deployed position wherein the articulating cavity portion 20 is in the deployed position. In various embodiments, the second linkage members 52, first linkage member 51, and/or articulating cavity portion 20 may articulate in more than one direction or path between the deployed position and the closed position. In the one embodiment shown in FIG. 3, the first linkage members 51, second linkage members 52, and the articulating cavity portion 20 travel in a first direction D1 (e.g. linear, longitudinal, horizontal direction) outwardly/laterally. Then, as shown in FIGS. 4 and 5, in a second direction D2 (e.g. arcuate, pivoted about an axis or pin 91, forward) outwardly/downwardly towards in front of the opening 13 and/or user when deploying to the deployed position. The articulating cavity portion 20 and/or linkage member(s) 40 may separately travel first in the longitudinal/horizontal direction D1 (e.g. linearly) and secondly in the arcuate direction D2 (e.g. about a pivot/hinge/pin) when traveling from the stowed position to the deployed position.

In some implementations, the appliance 10 and/or linkage members 50 may include one or more linkage track members 60. The one or more linkage track member 60 may guide the articulation of the plurality of linkage members 50 and/or articulating cavity portion 20 between the stowed position and the deployed position. The plurality of linkage members 50 and/or second plurality of linkage members 52 may include the linkage track member 60. In the one embodiment shown, the linkage member 52*d* or linkage track member 60 may be used with another one or more linkage members 50 on one or more of the lateral side walls 24/walls (e.g. bottom wall, back wall) of the articulating cavity portion 20/housing 12. The linkage track member 60 may be movable (e.g. pivotable) within the cavity 15 or housing 12. The linkage track member 60 may include at least one slot 62 to guide the articulating cavity portion 20, linkage members 50, and/or pins 90 between positions (e.g. stowed, deployed). The linkage track member 60 and/or slot 62 may include a first or arcuate slot portion 63 and a second or straight slot portion 64 engaging one or more pins 90, 91 of the linkage members 50 (e.g. linkage member 51*e*). The first portion 63 may be different from the second portion 64 as shown in the one embodiment. The first portion 63 may be substantially arcuate. The second portion 64 may be straight and positioned below the arcuate portion in the stowed position. The arcuate portion 63 of the slot 62 may be convex proximate the front side 11*a*/opening 13 when in the stowed position and/or deployed position.

In some implementations, the appliance 10 and/or linkage members 50 may include one or more pin and slot engagements 70. The linkage track member 60 and/or the linkage member(s) 50 (e.g. linkage member 51*e*) may include one or more pin and slot engagements 70, or portion thereof, to articulate the articulating cavity portion 20, actuator, if used, and/or linkage members 50. The pin and slot engagement 70 may include the slots 60 (e.g. arcuate portion 63, straight portion 64, etc.) of the linkage track member 60 and/or members 50 and the pins 90 (e.g. pin 91, etc.) of another linkage member 50, 51*e*. From the stowed position to the deployed position, the pin 90, 91 slides within the arcuate portion 63 towards the straight portion 64, wherein the linkage members 50 and the articulating cavity portion 20 linearly travel in the longitudinal/horizontal direction. Upon traveling for the linear direction and the pin 91 engages the straight portion 64 of the slot 62, the pin 90, 91 continues to slide downwardly and straight along the straight portion 64 to the deployed position of the articulating cavity portion and linkage members. With the pin 91 sliding in the straight portion 64, the articulating cavity portion 20 and linkage members 50 pivot along an arcuate path D2 towards the deployed position. It is understood that the travel or path would be reverse from the deployed position to the stowed position. Alternatively, the return path to the closed position may be different in some embodiments.

In some implementations, the appliance may include a door 30 (e.g. front) postionable between the closed position and an open position with the opening 13. In the closed position as shown in FIG. 1, the door 30 or door cavity portion 42 may close the opening 13 and/or define cooking cavity 40 or portions thereof. In the door's open position, the articulating cavity portion 20 may be positionable between the stowed and deployed position. Although the door is shown as hinged, it should be understood the door may connect to the housing in a variety of methods and constructions.

In some implementations, the appliance 10 may include one or more position verification devices 76 to indicate the articulating cavity portion 20 or portions of the appliance 10 (e.g. linkage member(s) 50, actuator, door, surfaces, seal/gasket system 80, etc.) are in one or more particular positions (e.g. closed, open, deployed, and/or stowed position). For example, when the articulating cavity portion 20 and/or door 30 are in the closed position the verification device 76 may allow energization of the microwave cooking appliance 10 (e.g. cooking cavity). In some implementations, the one or more verification devices 76 may be a limit switch 77. The one or more limit switches 77 may indicate that the articulating cavity portion 20 and/or door 30 is in the stowed/closed and/or locked position to allow energization or other operations of the appliance. The limit switch 77, if used, may be positioned in one or both cavities 15. When two limit switches 77 are used in the lateral cavities 15, as shown in the one embodiment, each lateral side of the articulating cavity portion 20 may be verified to be in the deployed/stowed position. The one or more limit switches 77 may verify the one or more linkage members 50 are in the stowed position. As shown in FIG. 3, when the one or more limit switches 77 is disengaged from the linkage members 50 (e.g. deployed position) or the articulating cavity portion is in the deployed position, the Magnetron is disengaged and does not allow energization. As shown in FIG. 2, when the one or more limit switches 77 is engaged with the linkage members 50 (e.g. stowed position) or the articulating cavity portion is in the stowed position, the Magnetron is engaged and allows energization. Although the limit switch is operably contacting a linkage member when in the closed or stowed position, the limit switch may be used in operation or operable contact with one or more linkage members 50 (e.g. first, second, etc.), actuator, articulating cavity portion, and/or door, or portions of the housing/appliance.

In some implementations, the articulating cavity portion 20 may be manually articulated. Alternatively or in combination with manual operation, if used, in some embodiments the user may articulate the articulating cavity portion 20 and/or door automatically. The appliance 10 may include one or more actuators articulating the articulating cavity portion 20, or portion of the appliance (e.g. linkage member(s) 50, actuator, pins 90, door 30, etc.) between two or more positions (e.g. closed, open, deployed, stowed). The actuator, if used, may articulate the articulating cavity portion 20 in various embodiments. The actuator, if used, may actuate a plurality of linkage members 50 connected to the articulating cavity portion 20 between a stowed position and a deployed position. In some embodiments, the actuator may be a linear and/or track actuator. The actuator may be positioned in the cavity 15. The actuator may be coupled to the articulating cavity portion 20 with one or more linkage members 50. The actuator may move or articulate the one or more linkage members 50 between the stowed position and the deployed position. The one or more ends connecting the actuator to the housing and/or linkage member(s) may pivot to allow the actuator to pivot during stowing and/or deploying of the articulating cavity portion 20.

In some implementations, the appliance may include one or more obstacle detection systems, if used, to reduce undesirable contact with the moveable articulating cavity portion coming into contact with obstacles (e.g. below the microwave housing or bottom). One embodiment of the obstacle detection system may be the actuator or motor. The actuator may reverse in direction upon contact or interference with an obstacle based upon one or more current levels reached. It should be understood that a variety of sensors (e.g. optical, IR) may be used in some embodiments of the obstacle detection system.

It should be understood that the articulating cavity portion 20, door 30, cavity 15, cooking cavity 40, actuator, linkage member(s) 50, pin and slot engagements 70, and/or linkage track member 60 may be a variety of sizes, shapes, materials, positions, quantities, and constructions and still be within the scope of the invention. Further, the articulating cavity portion may be automatically and/or manually operated in some embodiments.

In use, the user may manually stow/deploy the articulating cavity portion 20 as shown in the figures. Alternatively, the articulation of the articulating cavity portion 20 and/or linkage members 50 between positions may be activate by the user via the controls or sensors, or manually engaging the articulating cavity portion or other portions of the appliance. In some embodiments, the door and the articulating cavity portion 20 may be separately activated to open/close. In other embodiments, the door and the articulating cavity portion 20 may be activated together to open/close and/or stow/deploy. For example, the user could open the door and deploy the articulating cavity portion. In various embodiments, the user may deploy the articulating cavity portion and access the contents when the articulating cavity portion is in the deployed position. In some embodiments, the user may not deploy the articulating cavity portion and access the contents when the articulating cavity portion is in the stowed position. It should be understood that a variety of sequences and methods of articulating the articulating cavity portion relative to the housing/door could be used to access the contents within the articulating cavity portion or cooking cavity of the appliance.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A microwave cooking appliance comprising:

a cooking cavity having an articulating cavity portion, a door cavity portion, and a housing cavity portion;

a housing having an opening and a bottom, wherein the housing includes the housing cavity portion;

a door including the door cavity portion, wherein the door is movable between a closed position closing the opening and an open position different from the closed position; and wherein the articulating cavity portion is movable between a stowed position to define the cooking cavity with the door cavity portion and the housing cavity portion and a deployed position different from the stowed position, wherein the articulating cavity portion moves from the stowed position outwardly and downwardly to the deployed position in front of and lower than the bottom of the housing; and wherein the door further includes a choke groove, wherein the choke groove seals against the articulating cavity portion and the housing when both the door is in the closed position and the articulating cavity portion is in the stowed position.

2. The microwave cooking appliance of claim 1 further comprising a first plurality of linkage members and a second plurality of linkage members coupling the articulating cavity portion to the housing, wherein the first plurality of linkage members is a ten bar mechanism and the second plurality of linkage members is a four bar mechanism.

3. The microwave cooking appliance of claim 2 wherein the four bar mechanism includes at least one linkage track member guiding the articulation of the articulating cavity portion between the stowed position and the deployed position.

4. The microwave cooking appliance of claim 3 wherein the at least one linkage track member includes a pin and slot engagement with the first plurality of linkage members, wherein the pin and slot engagement includes a straight slot and an arcuate slot.

5. The microwave cooking appliance of claim 1 further comprising a plurality of linkage members having a linkage track member guiding the articulation of the articulating cavity portion between the stowed position and the deployed position.

6. The microwave cooking appliance of claim 5 wherein the linkage track member includes a pin and slot engagement with another one of the plurality of linkage members, wherein the pin and slot engagement includes a slot having a straight portion and an arcuate portion.

7. The microwave cooking appliance of claim 1 wherein the articulating cavity portion travels separately in a longitudinal direction and an arcuate direction between the stowed position and the deployed position.

8. A microwave cooking appliance comprising:

a cooking cavity having an articulating cavity portion, a door cavity portion, and a housing cavity portion;

a housing having an opening and a bottom, wherein the housing includes the housing cavity portion;

a door including the door cavity portion, wherein the door is movable between a closed position closing the opening and an open position different from the closed position;

wherein the articulating cavity portion is movable between a stowed position to define the cooking cavity with the door cavity portion and the housing cavity portion and a deployed position different from the stowed position, wherein the articulating cavity portion moves from the stowed position outwardly and downwardly to the deployed position in front of and lower than the bottom of the housing;

a plurality of linkage members coupling the housing to the articulating cavity portion, wherein the plurality of linkage members includes a linkage track member guiding the articulation of the articulating cavity portion between the stowed position and the deployed position; and wherein the door further includes a choke groove, wherein the choke groove seals against the articulating cavity portion and the housing when both the door is in the closed position and the articulating cavity portion is in the stowed position.

9. The microwave cooking appliance of claim 8 wherein the articulating cavity portion travels separately in a longitudinal direction and an arcuate direction between the stowed position and the deployed position.

10. The microwave cooking appliance of claim 8 wherein the linkage track member includes a pin and slot engagement with another one of the plurality of linkage members.

11. The microwave cooking appliance of claim 10, wherein the slot includes a straight portion and an arcuate portion.

12. The microwave cooking appliance of claim 8 wherein the articulating cavity portion includes at least one flange adjacent the opening of the housing when in the stowed position.

13. The microwave cooking appliance of claim 12 wherein the at least one flange depends downwardly from a bottom wall of the articulating cavity portion.

14. The microwave cooking appliance of claim 8 wherein a bottom wall of the articulating cavity portion is at an elevation lower than an elevation of the bottom of the housing in the deployed position than in the stowed position.

15. A microwave cooking appliance comprising:

a cooking cavity having an articulating cavity portion, wherein the articulating cavity portion includes a bottom wall, a back wall, and opposing side walls, and wherein the back wall and the opposing side walls extend upwardly from the bottom wall;

a housing having an opening and a bottom;

a door movable between a closed position closing the opening and an open position different from the closed position; and a plurality of linkage members coupling the housing to the articulating cavity portion, wherein the articulating cavity portion is movable between a stowed position within the housing and a deployed position different from the stowed position, wherein the bottom wall of the articulating cavity portion is at a first elevation when in the stowed position and a second elevation when in the deployed position lower than an elevation of the bottom of the housing and the first elevation.

16. The microwave cooking appliance of claim 15 wherein the plurality of linkage members includes at least one pin and slot engagement between at least two linkage members.

17. The microwave cooking appliance of claim 16 wherein a slot of the at least one pin and slot engagement includes a straight portion and an arcuate portion.

18. The microwave cooking appliance of claim 15 wherein the articulating cavity portion includes at least one flange depending from the bottom wall.

19. The microwave cooking appliance of claim 15 wherein the bottom wall of the articulating cavity portion does not vertically overlap with the bottom of the housing when in the deployed position.

20. The microwave cooking appliance of claim 15 wherein the bottom wall of the articulating cavity portion is at least partially in front of the bottom of the housing when in the deployed position.

* * * * *